United States Patent [19]

Lebourg

[11] 4,120,095
[45] Oct. 17, 1978

[54] METHOD AND APPARATUS FOR DETERMINING THE SPATIAL RELATIONSHIP BETWEEN TWO MISALIGNED TUBULAR MEMBERS

[76] Inventor: Maurice P. Lebourg, One Greenway Plaza East Suite 428, Houston, Tex. 77046

[21] Appl. No.: 713,281

[22] Filed: Aug. 10, 1976

Related U.S. Application Data

[63] Continuation-in-part of Ser. No. 609,196, Sep. 2, 1975, abandoned.

[51] Int. Cl.² ............................................. G01B 3/38
[52] U.S. Cl. ................................. 33/180 R; 33/21 C; 33/174 N; 29/407; 405/170
[58] Field of Search ................ 33/125 R, 1 CC, 1 M, 33/21 C, 174 N, 180 R, 181 R, 1 H, 26; 61/110, 111; 29/407

[56]   References Cited
U.S. PATENT DOCUMENTS

| 2,431,101 | 11/1947 | Woods | 33/180 R |
| 2,624,944 | 1/1953 | Pujda | 33/180 R |
| 2,692,434 | 10/1954 | Leffler | 33/26 |
| 2,906,179 | 9/1959 | Bower | 33/1 CC |
| 3,121,954 | 2/1964 | Foster | 33/1 H |
| 3,667,128 | 6/1972 | Morgan | 33/174 N |

FOREIGN PATENT DOCUMENTS 128,677  3/1902  Fed. Rep. of Germany ............. 33/180

Primary Examiner—Richard E. Aegerter
Assistant Examiner—John W. Shepperd
Attorney, Agent, or Firm—Arnold, White & Durkee

[57] ABSTRACT

A method and apparatus is disclosed for providing exact relative position information for two pipelines, particularly underwater pipelines, that are to be coupled together. The apparatus utilizes first and second gimbal assemblies secured to the ends of the pipelines by templates which establish a reference orientation for the gimbal assemblies relative to one another. A telescoping member having a slightly negative buoyancy connects between the first and second gimbal assemblies and includes potentiometers which indicate the distance and circular displacement between the gimbal assemblies. Each gimbal assembly provides pivotal movement of the telescoping member about two coordinate axes with potentiometers mounted on the gimbal assemblies indicating the angular positioning of the telescoping member relative to a coordinate axis. The values of the six parameters are supplied over electrical wires to a remote readout device for display and used to reproduce the misalignment situation on board a surface vessel. Alternatively, the values of the six parameters can be put into a computer programmed to calculate the dimensions and configuration of a spool that can be used to interconnect the two pipeline ends.

28 Claims, 8 Drawing Figures

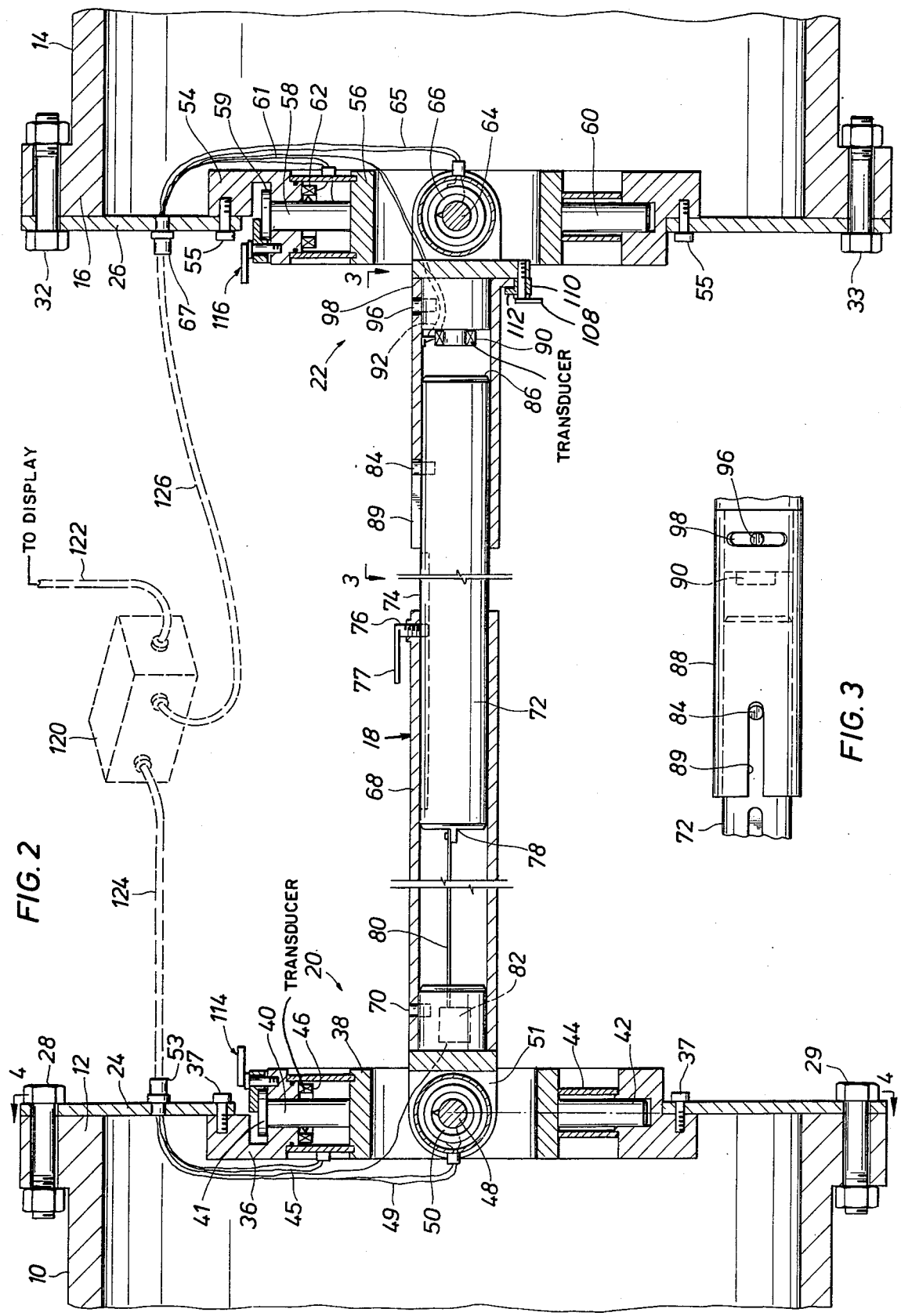

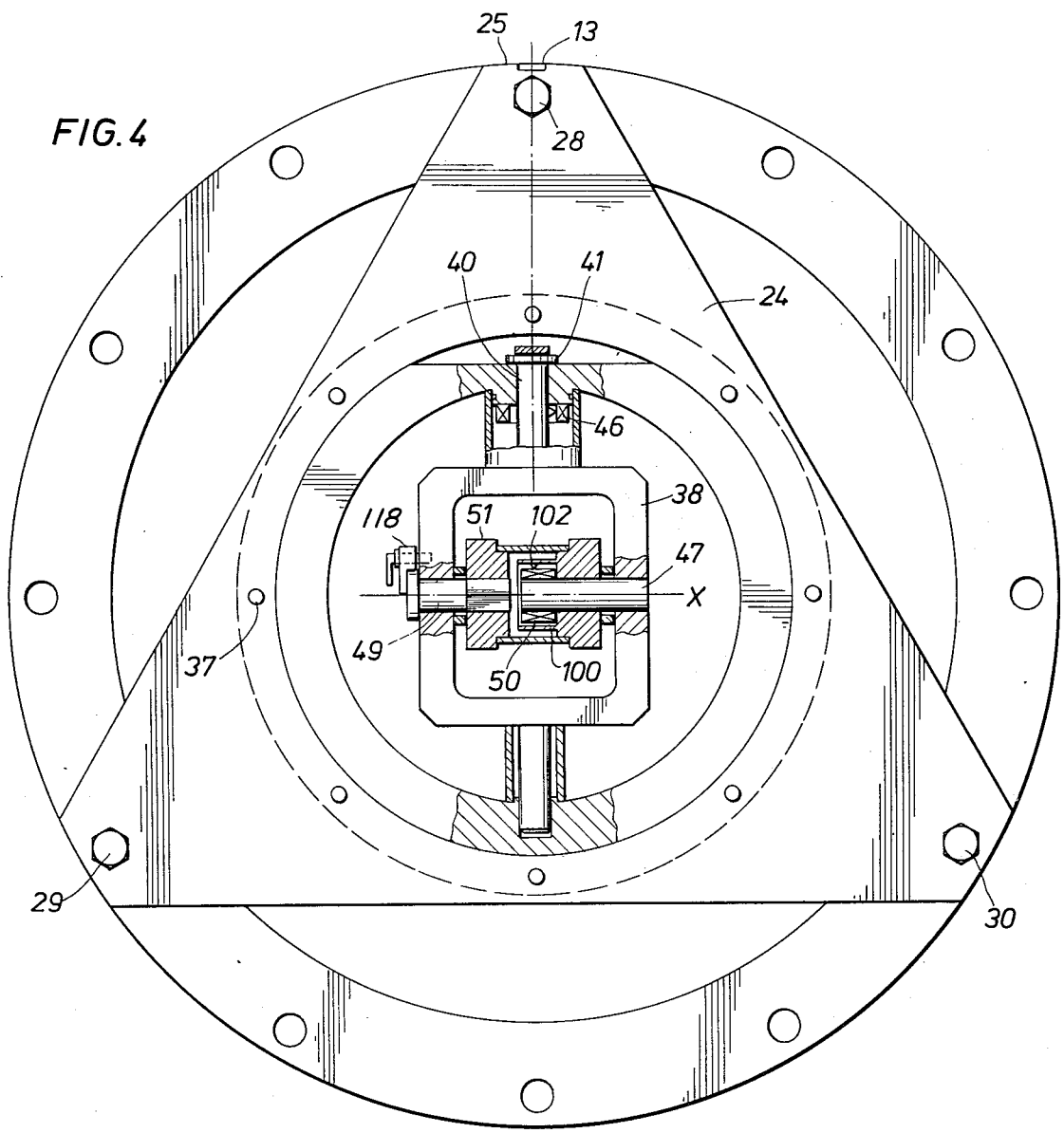

METHOD AND APPARATUS FOR DETERMINING THE SPATIAL RELATIONSHIP BETWEEN TWO MISALIGNED TUBULAR MEMBERS

CROSS REFERENCE TO RELATED APPLICATION

This application is a continuation-in-part of Ser. No. 609,196, filed Sept. 2, 1975, now abandoned.

BACKGROUND OF THE INVENTION

The instant invention relates to a novel method and apparatus for determining the relative position of two fixed bodies. More particularly, the instant invention is directed to a method and apparatus for ascertaining the relative position of two underwater pipelines that are to be coupled together.

It has heretofore been found difficult to couple together pipe sections which lay on the floor of a body of water. Often, the topography of the ocean floor, upon which a pipeline is layed, causes a section of pipe to assume an orientation that is different from that of another section. A situation such as this causes the ends of the pipe sections, which are to be joined, to be misaligned.

Additional pipeline misalignment problems may be brought about when it is desired to join two pipelines together which, through laying on a flat ocean floor surface, do not have their centerline axes placed colinearly. Further misalignment problems may be encountered if it is desired to couple a pipeline to a storage tank or the like. The pipeline may approach the storage tank opening at an angle rather than head on presenting yet another type of misalignment problem.

Various devices have been used to effect the coupling of underwater pipeline sections. One such device is that of U.S. Pat. No. 3,658,231, issued to Ocean Systems, Inc. The device disclosed therein includes a frame-like structure having a central chamber and movable end support fixtures. The ends of the pipe sections to be coupled are forced into alignment by pressure actuated mechanisms which engage the pipe sections. Aligning pipe sections by force generally subject the pipe sections to undesirable stresses which can cause serious damage to the pipeline.

Another device for coupling the ends of the pipe sections is that of U.S. Pat. No. 3,393,926. This device utilizes a coupling into which the ends of the pipe sections are received. The ends are gripped and sealed with the coupling by fluid actuated slips within the coupling. This device, though adequate, is not particularly desirable since the coupling must remain on the pipeline resulting in an economic disadvantage. Also, the ends must often be forced into alignment and are thus held coupled together under stress.

Another approach to coupling of the ends of pipe sections is that of Oliver, U.S. Pat. No. 3,835,655. In the technique disclosed, a first marker buoy is used to detachably support a tow line passing from the marker buoy through a guide member mounted on the end of the pipeline and back to the marker buoy. A second tow line connects between an end of another pipeline to be laid and a second marker buoy. The tow lines are connected together and the second pipeling is lowered until adjacent the first pipeline end. The connected tow line is pulled until the pipeline ends are joined. The ends of the second pipeline has a mating section having connections that provide universal movement to permit interconnection of misaligned ends. Although this approach is workable where one pipe end is movable relative to the other, in situations wherein repair of an existing pipeline is to be performed, this approach is not useable.

It is apparent that it would be desirable to be able to couple pipeline sections together by welding or bolting a connecting section of pipe, obviating the need for expensive coupling devices. It is also apparent that it would be desirable to so couple pipe sections without having to force the pipe sections into alignment, thereby reducing damaging stress.

Before a connecting section of pipe can be fabricated, the exact spatial relation of the planar ends of the two underwater pipelines must be determined. One approach in determining the relative position of two submerged pipelines is that of attaching pipe flanges on the ends of the pipelines and welding several connecting rods between the flanges. The flanges are then detached from the pipelines, and the entire structure consisting of the flanges and the connecting rods are brought to the surface. From the orientation of the flanges, the relative positioning of the ends of the submerged pipelines is ascertainable. Further details of this technique may be had by reference to the aritcle "Flanged spool connects subsea pipeline ends", *THE OIL AND GAS JOURNAL*, Feb. 3, 1975, pp. 92, 93 and 96. A disadvantage of this approach is that the structure of welded rods can be quite heavy, especially if the flanges are a substantial distance apart, and thus difficult to handle. Also, diver time and welding time are significant and make this technique expensive.

Another device for determining the spatial relationship between a pair of displaced pipeline ends is that of Morgan, U.S. Pat. No. 3,667,128. The device disclosed is a gauge having a pair of universally rotatable linkages with flange adapter plates positioned on each end of a support bar. The device is lowered from a lay barge by a winch down to the pipeline ends, and the rotatable linkages are manipulated to bring the flange adapter plates into engagement with the pipeline end flanges. The gauge is then raised to the deck of the lay barge where the exact spatial relationship of the underwater pipe ends may be re-established between a pair of template fixtures. A spool can then be fabricated by conventional means between the templates, and thereafter lowered for installation between the spaced pipeline ends.

Another similar device for determining the spatial relationship of two misaligned ends is that of Fischer et al., U.S. Pat. No. 3,270,426. This device is also an adjustable gauge comprising an elongate connecting member having an end plate at each end that is movable about two pivot axes. The end plates have a face formed thereon that matches the face of the flanges at the pipeline ends. The end plates are fitted into position against the pipe ends and are held by clamping mechanisms. With the end plates so held, the gauge is released from the pipeline ends and taken to the barge where it is used in conjunction with a template to reproduce the relative positions of the pipe ends.

These approaches to measuring the relative positions of two misaligned pipe ends and for reproducing the arrangement present similar disadvantages as the welded rod technique. Primarily, the devices could be quite heavy and cumbersome to manipulate. Also, diver time would likely be significant, making the use of such gauges quite expensive.

Another device for measuring the distance and alignment of flange surfaces so that the relative orientation of two pipe ends can be reproduced is that disclosed in German Pat. No. 128,677. The device comprises a telescoping pipe having a scale marked off over its length for reading the distance to which it is extended. A plate with a protractor is pivoted at each end of the telescoping pipe. One plate pivots about a horizontal axis and the other about a vertical axis. The amount of rotation of the plate is measured by the protractor. With the plates affixed to the faces of the pipeline ends, the distance between them and two angles can be measured. Although the measurements can successfully be used to reproduce the orientation of the pipeline ends by simulation with templates, there is not enough information nor are the measurements so made as to permit an interconnecting pipe spool to be fabricated merely from calculations.

SUMMARY OF THE INVENTION

It is one aspect of the instant invention to provide a method for determining the spatial relationship between two underwater pipelines that are to be interconnected.

It is one feature of this aspect to provide such a method wherein the parameters necessary to completely and accurately define the spatial relationship between the pipeline ends are registered and are transmitted to a remote location.

It is a further feature of this aspect to provide such a method wherein there is no requirement that the apparatus for registering the parameters be removed from underwater location and lifted to the surface in order to determine the spatial relationship between the submerged pipe ends.

It is another aspect of the instant invention to provide a novel apparatus for determining the exact relative position of underwater pipelines that are to be coupled together.

It is one feature of this invention to provide an apparatus which accurately measures the values of the orientation and distance parameters necessary to define the relative positioning of two pipe sections.

It is among the other features of this invention to provide an apparatus which can be easily attached to the ends of two pipelines by divers, which ends are desired to be coupled together.

It is among the further features of this invention to provide an apparatus utilizing gimbal assemblies to provide angular displacement of a connecting member about two axes of rotation.

It is a further feature of this invention to provide an apparatus wherein the orientation and distance parameters are remotely displayed and read.

These and other features of the instant invention will be apparent from the following detailed description, the drawings and claims.

According to the present invention, apparatus for determining the spatial relation of two misaligned pipelines comprises first and second gimbal assemblies providing freely pivotal movement about two axes. Each gimbal assembly is attached to a template which mounts upon the end of a pipeline section to be coupled and is positioned thereon so as to align one of the gimbal axes with a reference mark on the end of the pipeline, thereby designating it as a reference axis. The apparatus further comprises a telescoping section that connects between the first and second gimbal assemblies.

Each gimbal assembly is provided with electrical sensing means which translate the angular displacement of the telescoping member about the two axes of each gimbal assembly. The telescoping member is also provided with electrical sensing means which translates the distance between the two gimbal assemblies into measurable electrical quantities. In addition, the telescoping section has electrical sensing means which translates the angular displacement between the reference axes of the gimbal assemblies. The various electrical sensing means produce electrical signals which may be remotely read by appropriate instruments on board a surface vessel. From the measured values of the electrical signals, which represent and provide information of all the necessary parameters, an interconnecting spool section can be fabricated.

The remotely received readings of the orientation parameters may be used to reproduce the pipe end misalignment situation existing underwater using a mockup built on the deck of the surface vessel. From the mock-up, an interconnecting spool section can be fabricated by conventional techniques. Alternatively, the readings of the parameters can be put into a computer programmed to simulate the misalignment situation and to formulate a model of an interconnecting spool.

Other aspects of this invention not outlined above will be apparent from the detailed description below.

BRIEF DESCRIPTION OF THE DRAWINGS

In order that the manner in which the above-recited advantages and features of the invention are attained, as well as understood in detail, reference may be had to the specific embodiment which is illustrated in the appended drawings. It is to be noted, however, that the appended drawings illustrate only a typical embodiment of the invention and therefore is not to be considered limiting of its scope for the invention may admit to other equally effective embodiments.

In the drawings:

FIG. 2 is a side cross-sectional view of typical gimbal assemblies in place at the ends of two pipe sections and a typical telescoping section connecting therebetween.

FIG. 3 is a plan view of the mechanism utilized for metering the angular displacement between the reference axes of the gimbal assemblies.

FIG. 4 is an enlarged sectional view, along line 4—4, of a template mounted on the end of a section of pipe and carrying a gimbal assembly.

DETAILED DESCRIPTION OF THE PREFERRED EMBODIMENT

Figure 1A:
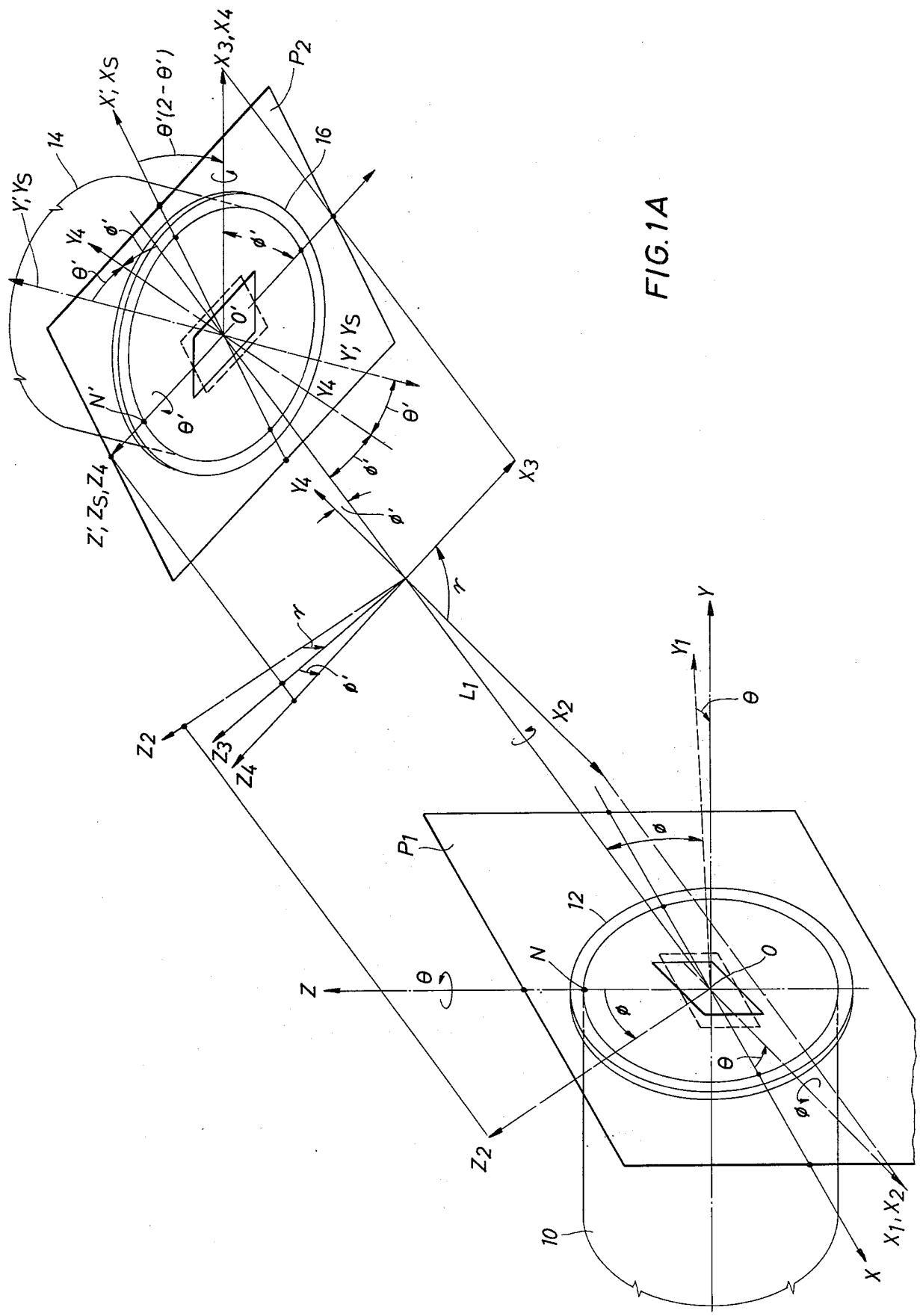
FIG. 1A is a schematic diagram of two pipe sections which are desired to be joined together and illustrates the necessary parameters for defining the exact relative position of the pipelines.

Referring to FIG. 1, there is shown a first pipeline section 10 having a flange 12 and a second pipeline section 14 having a flange 16. Pipeline sections 10 and 14 are shown to have a relative orientation in which the centerlines of each are non-colinear. Represented schematically are two coordinate systems, each having two separate axes, formed at the ends of pipelines 10 and 14.

The coordinate system associated with the end of pipeline section 10 defines two angle parameters, $\phi$ and $\theta$, which represent the angular position of a line segment $L_1$ rotated separately about the X and Z axes, respectively, of the coordinate system of pipeline section 10. The angle $\phi$ is measured between the X-Y plane and line segment $L_1$ or alternatively with respect to the Z axis. The angle $\theta$ is measured between a projection of line segment $L_1$ onto the X-Y plane and the Y axis.

A second coordinate system having first and second coordinate axes, X' and Z', is formed at the end of pipeline section 14. The second coordinate system lies coplanar with the flange 16 attached to the end of pipeline section 14 with the spatial orientation of pipeline section 14 being represented by the parameters $\phi'$ and $\theta'$. As with the parameters $\phi$ and $\theta$ of the first coordinate system, the parameters $\phi'$ and $\theta'$ represent the angular rotation of line segment $L_1$ about the two coordinate axes defined at the end of pipeline section 14. The angles $\phi'$ and $\theta'$ are measured in a manner similar to the angles $\phi$ and $\theta$. All the angle parameters are measured from an initial position wherein line segment $L_1$ is perpendicular to the X-Z plane of the coordinate systems.

Line segment $L_1$ spans the distance between the origins of the two coordinate systems. The origins of each axis provide indexing points from which the lineal distance between the center of the planar ends 12 and 16 can be determined. In addition, provision must be made for a determination of the circular positioning of the pipeline sections 10 and 14 relative to one another based upon the angular displacement between the chosen reference axes of each coordinate system as projected onto a plane perpendicular to line $L_1$. This parameter is represented by $\gamma$.

It will be apparent from the representation given in FIG. 1A that six parameter variables are utilized to represent the relative positioning of pipeline sections 10 and 14. With the values of the various parameters known, it is then possible to construct a coupling section to fit between the two pipeline sections, placing them in communication with one another.

Referring to FIG. 2, there is shown a cross sectional view of the preferred embodiment of an apparatus for implementing the concepts of the present invention. Specifically, gimbal assemblies 20 and 22 are shown attached to flanges 12 and 16 by templates 24 and 26. Templates 24 is secured to flange 12 by bolts 28, 29 and 30 (not shown), and template 26 is secured to flange 16 by bolts 32, 33 and 34 (not shown). The positioning of templates 24 and 26 on flanges 12 and 16 is made with reference to alignment notches 13 (FIG. 4) and 15 (not shown) on the edges of flange 12 and flange 16, respectively, with the axes Z and Z' being aligned with the notches.

Gimbal assembly 20 includes a gimbal housing 36 which mounts to template 24 by screws 37 and carries a gimbal yoke 38 having upper and lower spindles 40 and 42. Lower spindle 42 is journaled in a bearing 44 formed in gimbal housing 36, and upper spindle 40 is received into a portion of gimbal housing 36 where it is operably connected to electrical sensing means 46. Electrical sensing means 46 can be a variable impedance device which is to be directly read for the value thereof, or it can form a portion of the frequency determination network in a variable frequency oscillator. Electrical sensing means 46 serves to translate the $\theta$ parameter of gimbal 20 into a representative electrical quantity, i.e., impedance value or frequency.

The horizontal coordinate axis, X, of gimbal assembly 20 is defined by axle 48 which is carried in gimbal yoke 38. Attached to axle 48 is a second electrical sensing means 50 translating the $\phi$ parameter of gimbal 20, which electrical sensing means 50 is mounted in a body portion 51 having an extension 52 that forms an indexing point on gimbal assembly 20. In the preferred embodiment shown, electrical sensing means 50 is a variable impedance device which as pointed out previously with regard to electrical sensing means 46 could be used in conjunction with a variable frequency oscillator.

Electrical connections from both electrical sensing means 46 and 50 can be by conductor pairs 45 and 49 which connect to a plug receptacle 53 mounted to template 24. Plug receptacle 53 would be color-coded or marked in some way to identify that it is associated with gimbal 20, or it could be a one-way plug having a unique pin connection layout.

Gimbal assembly 22 is identical to gimbal assembly 20 and includes a gimbal housing 54, connecting to template 26 by screws 55, and a gimbal yoke 56 having upper and lower spindles 58 and 60. Electrical sensing means 62, translating the $\theta'$ parameter, mounts within gimbal housing 54 and receives upper spindle 58. A second coordinate axis is defined by axle 64 carried in gimbal yoke 56 having electrical sensing means 66 mounted thereon to translate the parameter $\phi'$ into a representative electrical quantity.

Electrical connections to electrical sensing means 62 and 66 are made by conductor pairs 61 and 65, respectively, which connect to plug receptacle 67 mounted on template 26. Plug receptacle 67 is color-coded or marked to be identifiable from plug receptacle 53.

Connecting member or extensible member 18 is shown to be telescoping and connects between gimbal assemblies 20 and 22 at the centers thereof. Member 18 thus interconnects indexing points at the origin of the coordinate axis system defined by the positioning of the gimbal assemblies relative to notches 13 and 15. Connecting member 18 has an outer tubular portion 68 which fits onto extension 52 and is held in place thereon by a pin 70, and also includes an inner portion 72 which slides freely within the outer tubular portion 68. The inner sliding portion 72 has a groove 74 formed over a portion of its length through which guide pin 76, carried by the tubular portion 68, slides freely. End 78 of inner portion 72 has connected to it a string 80 which connects to electrical sensing means 82 shown to be mounted inside extension 52 and also connecting to plug receptacle 53. String 80 operates a take-up spool (not shown) which is mechanically coupled to electrical sensing means 82 such that a change in the length of connecting member 18, produced by the sliding of inner portion 72 within tubular portion 68, will be translated by the electrical sensing means 82 into a representative electrical quantity. If necessary, several additional segments can be added to inner portion 72 to extend its length so long as proper referencing to the notch 13 on flange 12 is observed.

The opposite end of inner portion 72 carries a pin 84, which along with the end 86 of inner portion 72 is received into a sleeve portion 88. Pin 84 is aligned with pin 70 and is consequently aligned with notch 13 on flange 12. Sleeve portion 88 fits onto extension 92, which forms an indexing point on gimbal assembly 22, and has a longitudinal slot 89 for receiving pin 84. Electrical sensing means 90 is mouted to extension 92 and is mechanically coupled to sleeve 88 such that rotational movement of sleeve 88 relative to extension 92 will be sensed by electrical sensing means 90 which is connected by wires 61 to plug receptacle 67.

Connecting member 18 is securely attached to gimbal assemblies 20 and 22, and is extensible or retractable to permit variations in length, with inner portion 72 freely sliding within tubular portion 68 guided by guide pin 76 and groove 74. Preferably the overall buoyancy of member 18 is neutral or only slightly negative to assure against bending and consequent erroneous readings. Rotational movement of inner portion 72 relative to tubular portion 68 is prevented by the arrangement of guide pin 76 and groove 74, but sleeve portion 88 is designed for limited rotational movement relative to inner portion 72 and the remainder of connecting member 18. A more detailed understanding of this arrangement may be had by reference to FIG. 3.

As may be seen in the view of FIG. 3, slot 98 extends over a portion of the circumference of sleeve portion 88 with pin 96 extending upwardly from extension 92 into slot 98. Sleeve portion 88 is permitted to turn about extension 92 until pin 96 stops the movement. As sleeve portion 88 is rotated, electrical sensing means 90, which is mechanically coupled to sleeve portion 88, translates sleeve position (the parameter $\gamma$) into a representative electrical quantity. If the reference axes of gimbal assemblies 20 and 22 are not in circular alignment, that is, the "roll" of one pipeline is different from the other, sleeve 88 must be rotated in order for pin 84 to slide into the slot 89. The amount of rotation required is sensed by electrical sensing means 90 to indicate the circular displacement between the reference axes of gimbals 20 and 22.

Shown in phantom in FIG. 2 is a container 120 which houses an oscillator for supplying an electrical signal to the service ship, which signal is of a defined frequency. A multi-wire cable 122 extends between container 120 and the service ship with the wires therein supplying power to the oscillator, providing conductors for the output signal of the oscillator, and carrying control signals to a stepping relay. Cables 124 and 126 connected between container 120 and plug receptacles 53 and 67 respectively. A stepping relay sequentially connects each electrical sensing means 46, 50, 82, 62, 66, and 90 to the oscillator in container 120.

In the preferred embodiment, the electrical sensing means are variable impedance potentiometers. The potentiometers are utilized as a component in the frequency determining portion of the oscillator; and thus, the oscillator will output a signal of a frequency which is dependent upon the impedance value of the particular potentiometer connected to it. The impedance values of electrical sensing means 46, 50, 62 and 66 are, of course, determined by the position of the extensions 52 and 92 which are indexing lugs to measure the angular displacement between notch 13 and notch 15 (i.e., angle $\gamma$) with respect to the plane of the ends of the pipelines, and the impedance values of electrical sensing means 82 and 90 are determined by the distance and circular displacement between the gimbal assemblies 20, 22. Therefore, by taking a reading of the frequency of the oscillator output signal as each potentiometer is being separately connected to the oscillator, the values of the various parameters necessary for the determination of the spatial orientation of the pipelines will be known.

Referring now to FIG. 4, there is shown a front view of the flange portion 12 of pipeline section 10, having mounted thereon template 24 and gimbal assembly 20. In this view, template 24 is shown to be a triangular plate-like member connecting to flange 12 by bolts 28, 29 and 30. Alignment notch 25 in template 24 serves to designate the axis formed by upper and lower spindles 40 and 42 as the reference axis for the coordinate system. For proper reference alignment of the gimbal assembly 20, the flange 12 is marked in the same manner by notch 13 to designate the positioning of notch 25 of template 24 relative to the flange 12.

In this view, gimbal yoke 38 is shown to be a rectangularly shaped piece having segment 47 of axle 48 secured firmly therein with electrical sensing means 50 mounted thereon which has a portion 100 secured firmly to axle segment 47. Another segment 49 of axle 48 rotates in gimbal yoke 38 with another portion 102 of electrical sensing means 50 fixed thereon. Body portion 51 is shown to be affixed to the portion 102 of electrical sensing means 50 and enclose around it.

The gimbal assembly 20, as shown, provides pivotal movement about the Z axis defined by upper and lower spindle 40 and 42 and further provides pivotal movement about the X axis defined by axle 48. As stated previously, gimbal assembly 22 is identical in construction to gimbal 20 and provides the same pivotal movement.

Referring to FIGS. 2 and 4, to provide back-up protection in case of a failure of the electrical sensing means or a break in the conductors attached to them, lock down mechanisms are provided for all movable, parameter registering portions of the apparatus. For example, pin 76 is threaded and screws through outer portion 68 of connecting member 18 and into contact with the bottom of groove 74 in inner portion 72. Pin 76 is provided with a crank arm 77 which permits a driver to screw pin 76 tightly against inner portion 72, thereby fixing the position of the inner portion 72 and preserving its location. Also, a lock-down 108, formed of a threaded bolt 110 and a clamp member 112, provides a means to fix the position of sleeve 88 and thereby preserve the value of the circular displacement parameter $\gamma$. Inner portion 72 could be marked with a length scale thereon to provide a direct reading therefrom of the length of connecting member 18, and plate 111 to which sleeve 88 is clamped against by lock-down 103 could have a circular displacement dial or similar vernier dial marked thereon to provide a direct reading therefrom of the circular displacement between gimbal reference axes.

In addition, the gimbals 20 and 22 have lock-down mechanisms to permit the angular displacement of the ends of connecting member 18, as registered by its rotation about the coordinate axes, to be preserved. Specifically, gimbal 20 is provided with lock-down 114 (FIG. 2) which serves to clamp the head 41 of upper spindle 40 and prevent movement thereof, and similarly, gimbal 22 is provided with a lockdown 116 which clamps the head 59 of upper spindle 58. Lock-downs 114 and 116 are identical in construction to lock-down 108 previously described in detail above.

With reference to FIG. 4, another lock-down 118 for gimbal 20 is shown mounting on gimbal yoke 38 to fix the position of segment 49 of axle 48. Lock-down 118 preserves the value of the parameter for pipeline 10 and is identical in construction to the other lock-down devices. As with connecting member 18, gimbals 20 and 22 could have a scale marked thereon to permit direct readings of the parameters.

Once the lock-down devices are tightened to secure the positions of the gimbals 20, 22 and connecting member 18, the apparatus may be removed from the submerged pipelines and brought to the surface. The apparatus can be broken down into two portions by removing inner portion 72 from sleeve 88 to permit easier handling of the apparatus without losing the circular displacement reading since sleeve 88 is held by lock-down 108.

Figure 5:
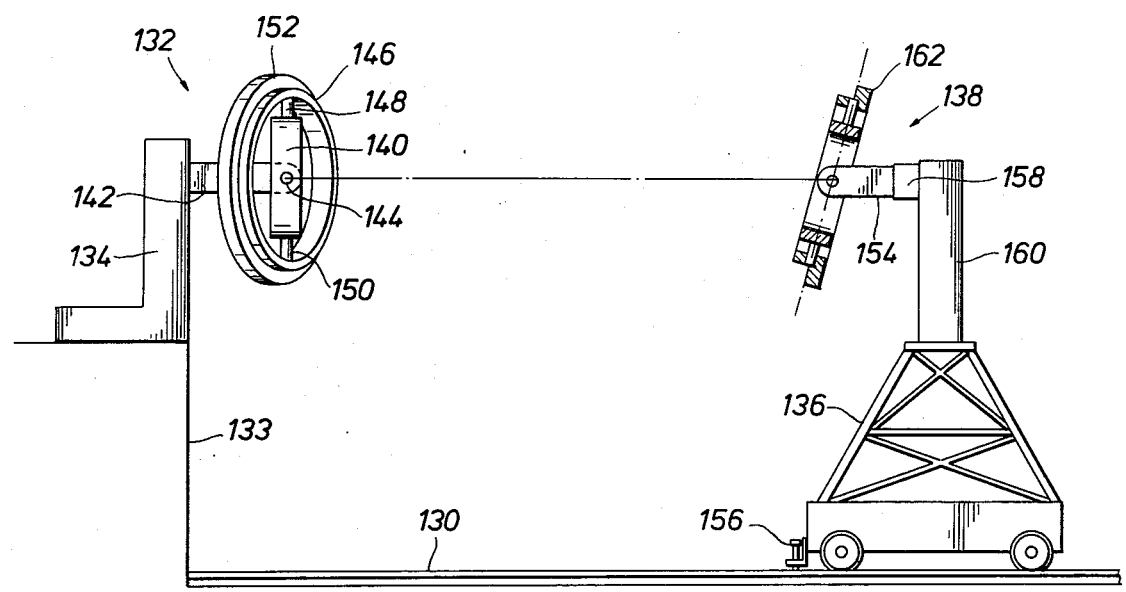
FIG. 5 is a side view of a work bench on board a service vessel, which work bench is utilized in the fabrication of a connecting section.

Referring now to FIG. 5, there is shown equipment which is utilized for the fabrication of the connecting section of pipe for the misaligned submerged pipelines. Work bench 130 includes a gimbal assembly 132 mounted on an elevated portion 133 which gimbal assembly 132 is supported by a mounting support 134. Also shown is a trolley 136 which supports a second gimbal assembly 138. The gimbal assemblies 132 and 138 simulate the spatial orientation of the ends of the submerged pipelines.

Gimbal assemblies 132 and 138 are very similar to gimbal assemblies 20 and 22. Specifically, gimbal assembly 132 includes an inner ring 140 that is pivotally attached to an extension 142 by a clevis-like arrangement 144. In addition, an outer ring 146 receives upper and lower spindles 148 and 150 that are mounted on ring 140. Outer ring 146 includes bearing surfaces in which ther upper and lower spindles are journaled. A flange connection 152 is attached to outer ring 146 and extends entirely around the gimbal assembly 132. The flange 152 provides a point of attachment for the flange of the connecting section that is to be fabricated.

Gimbal assembly 138 is similar to gimbal assembly 132, and therefore, the details of gimbal assembly 138 will not be described. Gimbal assembly 138 is mounted on the movable trolley 136 and is provided with forward and backward movement. Also, trolley 136 is placed on work bench 130 such that the extensions 142 and 154 are aligned. A lock-down clamp 156 is provided which permits trolley 136 to be firmly held in position once it is positioned to establish the proper distance relationship between gimbals 132, 138.

Gimbal assembly 138 is provided yet further with circular movement to permit the simulation of the circular displacement between reference axes of the gimbal assemblies 20 and 22. This movement is provided by a rotatable fitting 158 that connects extension 154 to a mount 160 on trolley 136.

Both gimbal assembly 132 and gimbal assembly 138 have verniers to permit accurate settings of the orientation of flange connections 152 and 162. Also, the gimbal assemblies 132 and 138 have lock-down devices (not shown) which fix the gimbals in the desired position that simulates the arrangement of the submerged pipeline ends.

Figure 6:
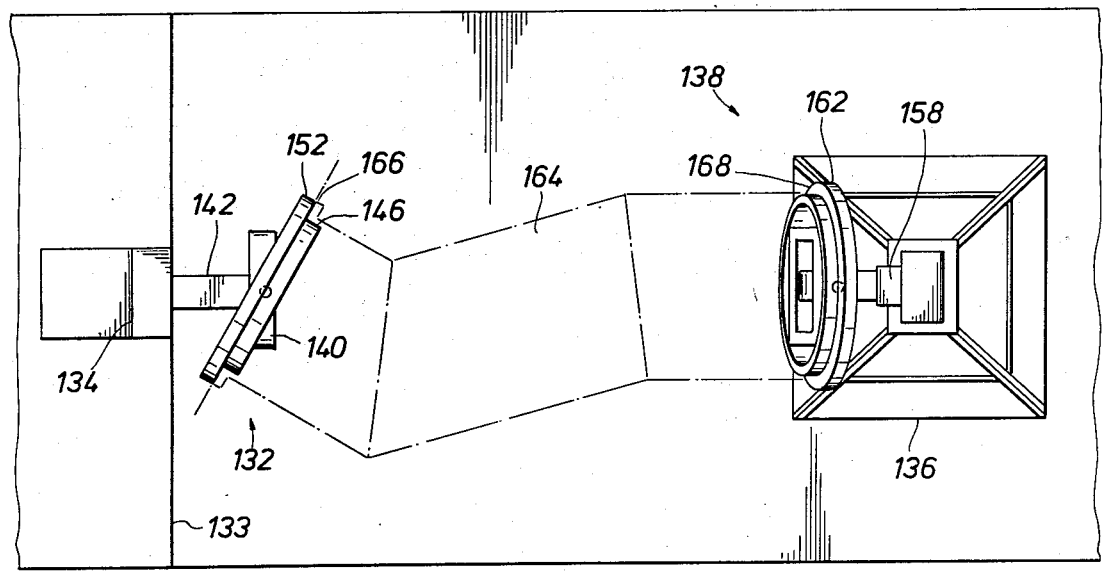
FIG. 6 is a top view of the work bench shown in FIG. 5.

FIG. 6 is a plan view of the equipment shown in FIG. 5. In addition, there is shown a connecting pipe section 164 shown in place on work bench 130 and which is under fabrication. The flanges 166 and 168 are held onto flange connections 152 and 162 so as to place the front edge of the flanges in line with the center lines of the gimbal assemblies.

In operation, the apparatus of the present invention will be carried by divers to the submerged location of the pipeline sections with the connecting member 18 attached to gimbal assemblies 20 and 22 or carried separately with attachment being made on location. Upon reaching the location, the divers will mount assemblies 20 and 22 to the ends of the pipeline sections at the proper location on the pipeline section flanges to align the reference axes, Z and Z', with the notches 13 and 15.

If the two pipeline sections are misaligned, the connecting member 18 will not be perpendicular to the coordinate axis systems defined by gimbal assemblies 20 and 22, but will assume some other orientation in space, depending upon the relative positioning of the pipeline sections. FIG. 1A illustrates one example of misalignment between pipeline sections and the corresponding attitude that connecting member 18 will assume. As is evident from the schematic diagram of FIG. 1A, connecting member 18 pivots about the Z' axis, to a position wherein it defines an angle $\theta$ with the Z' axis. Similarly, connecting member 18, in assuming the orientation shown, pivots about the Z axis and defines an angle $\theta$ with respect to the X axis, and also pivots about the X axis and defines an angle $\phi$ with respect to the Z axis.

The various electrical sensing means which translate these parameters into representative electrical quantities are connected via conductors to an oscillator which will generate an electrical signal having a periodic waveform that is determined by the electrical sensing means. Readings for the parameters, i.e., the distance L between the two pipeline sections, the angular displacement between the reference axes of the two gimbal assemblies and the pitch and yaw parameters $\phi$, $\phi'$, $\theta$ and $\theta'$, can be made sequentially with the frequency values being displayed on a read-out device or fed into a computer for processing that is located at some remote station. It would also be feasible to have the oscillator output signal modulate a carrier signal to provide ratio wave transmission of the parameter readings to a location a great distance away from the submerged pipeline location, for example, to a location on shore rather than a vessel proximate the pipeline.

With the values of the six variables known, the exact relative position of two pipeline sections can be ascertained. Accordingly, a mock-up can be built on board the service ship to simulate the misalignment problem faced and a connecting pipe section having the proper dimensions and form shown in dotted outline at 164 can be fabricated and lowered to the underwater location, and installed between the two misaligned pipe sections. Preferably, since circular flanges are most typically available, the connecting section is fabricated using circular flanges at each end. Curved rather than straight sections may be used.

An alternative approach to the fabrication of an interconnecting spool is that of utilizing the parameter measurements obtained from the remotely read electrical signals from the various electrical sensing means to formulate a design of the spool on a computer. With a computer, a spool can be completely defined before it is built by simulating the spool on the computer in the form of a mathmatical model.

In computer simulation, the mathmatical equations and data needed to design a spool are stored in a computer. The necessary data will normally be the values of the parameters which define the spatial relationship of the pipeline ends and any limitations that are to be placed on the spool design, such as minimum angles of intersection between adjacent spool sections. The spool designer, using a typewriter-like terminal or a visual display unit to communicate with the computer, can vary the configuration of the spool until a design is achieved that will be an exact interconnecting fit between the misaligned pipe ends. After the overall spool is designed, a print out of the exact specifications of the spool sections can be obtained from which workers can fabricate the actual spool.

In order to perform computer simulation as generally described above to design a spool configuration for interconnecting two pipeline ends, the exact spatial relationship of the pipeline ends must be known. The apparatus herein described provides information in the form of the six parameters $\theta$, $\theta'$, $\phi$, $\phi'$, $\gamma$ and L (see FIG. 1A) which are adequate to completely describe the spatial relationship of the pipeline ends. These parameters are, of course, determined with respect to the Cartesian coordinate axis systems formed at each of the pipeline ends. These two coordinate axis systems (X, Y, Z; and X', Y', Z') are further illustrated in FIG. 1B which shows each system in a plane $P_1$, $P_2$, each being a plane of a face of a pipe end.

Before proceeding with the development of the equations necessary for computer simulation and determination of an interconnecting spools, the parameters being measured are summarized as follows:

$\theta$ = rotation of connecting member 18 about the Z axis of the coordinate axis system of pipe end 10.

$\phi$ = rotation of connecting member 18 about the X axis of the coordinate axis system of pipe end 10.

$\theta'$ = rotation of connecting member 18 about the Z' axis of the coordinate axis system of pipe end 14.

$\phi'$ = rotation of connecting member 18 about the X' axis of the coordinate axis system of pipe 14.

$\gamma$ = rotation of outer sleeve 88 about inner sleeve 72.

$L_1$ = the center-to-center distance between the origins of the coordinate axis systems at the ends of pipes 10 and 14.

In the following equations, $\delta = -\theta'$.

By utilizing a movable set of Cartesian axes, which are initially coincident with the coordinate axes in plane $P_1$ and undergo a sequence of successive rotations with respect to the fixed origin 0 in the plane $P_1$, transformation equations can be written to relate the coordinate axis systems of planes $P_1$ and $P_2$. The result of using a movable set of axes rotated about the origin 0 is that a set of coordinate axes may be defined which will be parallel to the coordinate axis system in plane $P_2$.

For rotation of the movable axes about the $Z_1$ axis through an angle $\theta$, the resulting $X_1$, $Y_1$, $Z_1$ axes are related to the X, Y, Z axes by the transformation equation:

$$\overline{X}_1 = \overline{F}\,\overline{X},$$

where the symbol $\overline{X}$ is used for the column vector $$\begin{pmatrix} X \\ Y \\ Z \end{pmatrix}$$

and the rotation matrix $\overline{F}$ is $$\overline{F} = \begin{pmatrix} \cos\theta & \sin\theta & 0 \\ -\sin\theta & \cos\theta & 0 \\ 0 & 0 & 1 \end{pmatrix}$$

For rotation of the movable axes about the $X_1$ axes through an angle $\phi$, the resulting $X_2$, $Y_2$, $Z_2$ axes are given by the transformation $$\overline{X}_2 = \overline{E}\,\overline{X}_1,$$

where $$\overline{E} = \begin{pmatrix} 1 & 0 & 0 \\ 0 & \cos\phi & \sin\phi \\ 0 & -\sin\phi & \cos\phi \end{pmatrix}$$

The results of these two rotations applied in the order specified gives a set of axes ($X_2$, $Y_2$, $Z_2$) which are oriented such that the $Y_2$ axis is the longitudinal axis of the line $L_1$ between O and O'.

Applying the transformations successively gives $$\overline{X}_2 = \overline{E}\,\overline{X}_1 = \overline{E}\,\overline{F}\,\overline{X} = \overline{M}\,\overline{X},$$

where $$\overline{M} = \overline{E}\,\overline{F} = \begin{pmatrix} \cos\theta & \sin\theta & 0 \\ -\cos\phi\sin\theta & \cos\phi\cos\theta & \sin\phi \\ \sin\phi\sin\theta & -\sin\phi\cos\theta & \cos\phi \end{pmatrix}$$

The direction cosines of the line $L_1$ relative to the X, Y, Z axes are given by the elements in the second row of matrix $\overline{M}$ as:

$l_o = -\cos\phi\sin\theta$ $m_o = \cos\phi\cos\theta$ $n_o = -\sin\phi\cos\theta$ Rotation of the movable axes about the $Y_2$ axis through an angle $\gamma$ gives a set of axes $X_3$, $Y_3$, $Z_3$. The transform equation is $$\overline{X}_3 = \overline{D}\,\overline{X}_2,$$

where $$\overline{D} = \begin{pmatrix} \cos\gamma & 0 & -\sin\gamma \\ 0 & 1 & 0 \\ \sin\gamma & 0 & \cos\gamma \end{pmatrix}$$

Rotation of the movable axes about the $X_3$ axis through an angle $\phi'$ yields another set of axes ($X_4$, $Y_4$, $Z_4$) which are related to the ($X_3$, $Y_3$, $Z_3$) axes by the transformation $$\overline{X}_4 = \overline{C}\,\overline{X}_3,$$

where $$\overline{C} = \begin{pmatrix} 1 & 0 & 0 \\ 0 & \cos\phi' & \sin\phi' \\ 0 & -\sin\phi' & \cos\phi' \end{pmatrix}$$

Rotation of the movable axes about the $Z_4$ axis through an angle $\delta'$ yields a $(X_5, Y_5, Z_5)$ coordinate axis system given by the transformation $$\overline{X}_5 = \overline{B}\,\overline{X}_4,$$

where $$\overline{B} = \begin{pmatrix} \cos\delta & \sin\delta & 0 \\ -\sin\delta & \cos\delta & 0 \\ 0 & 0 & 1 \end{pmatrix}$$

Figure 1B:
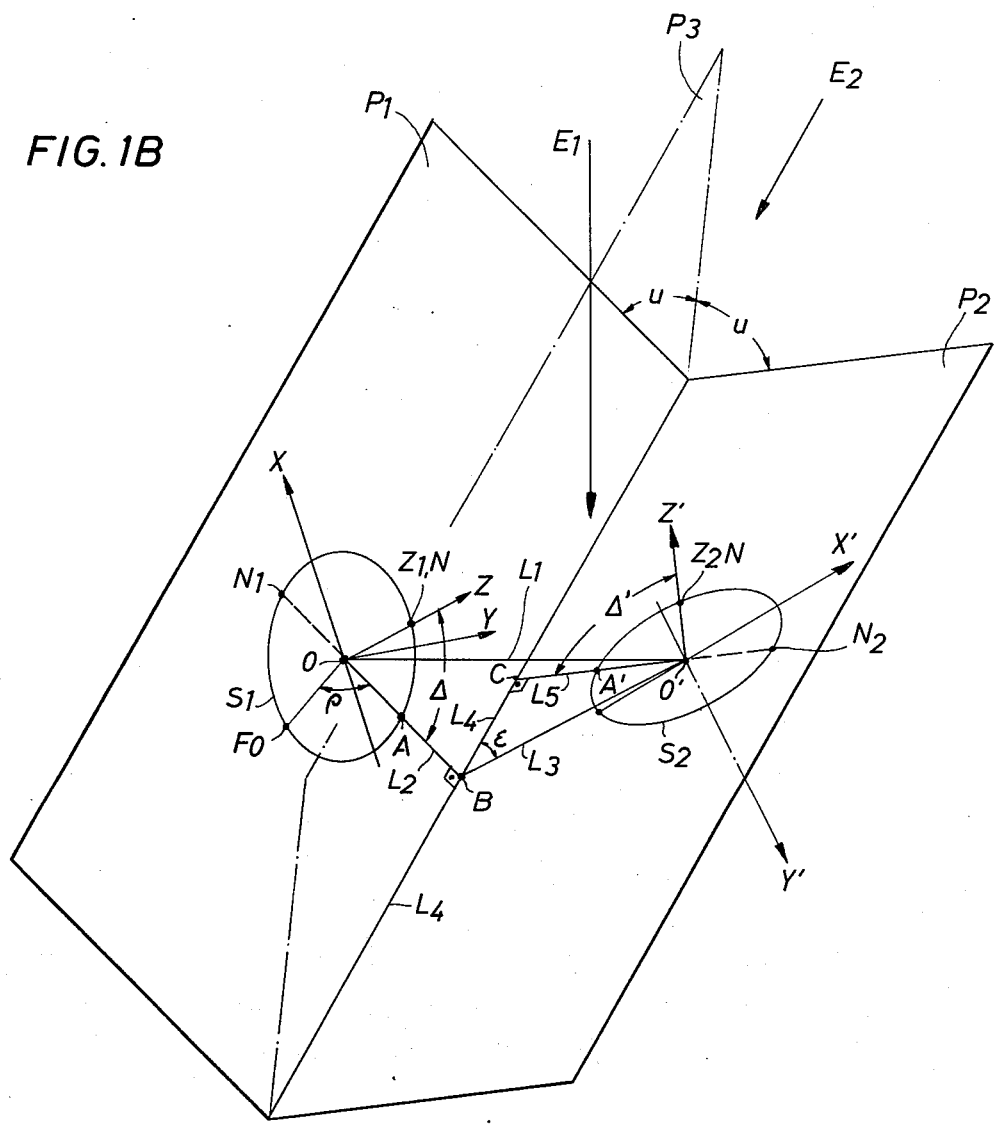
FIG. 1B is a schematic diagram of a pipeline end misalignment situation with the geometric parameters necessary to model a connecting spool on a computer indicated thereon.

After all of the above rotations are applied, a set of axes $(X_5, Y_5, Z_5)$ is obtained, which axis are parallel to the $X'$, $Y'$, $Z'$ axes in plane $P_2$. Successive application of the transformation gives $$\overline{X}_5 = \overline{B}\,\overline{X}_4 = \overline{B}\,\overline{C}\,\overline{X}_3 = \overline{B}\,\overline{C}\,\overline{D}\,\overline{X}_2 = \overline{B}\,\overline{C}\,\overline{D}\,\overline{M}\,\overline{X} = \overline{A}\,\overline{X},$$

where matrix $\overline{A} = \overline{B}\,\overline{C}\,\overline{D}\,\overline{M}$ having the elements of:

$a_{11} = (\cos\delta\cos\gamma + \sin\delta\sin\phi'\sin\gamma)\cos\theta - \sin\delta\cos\phi'\cos\phi\sin\theta + (-\cos\delta\sin\gamma + \sin\delta\sin\phi'\cos\gamma)\sin\phi\sin\theta$ $a_{12} = (\cos\delta\cos\gamma + \sin\delta\sin\phi'\sin\gamma)\sin\theta + \sin\delta\cos\phi'\cos\phi\cos\theta - (-\cos\delta\sin\gamma + \sin\delta\sin\phi'\cos\gamma)\sin\phi\cos\theta$ $a_{13} = \sin\delta\cos\phi'\sin\phi + (-\cos\delta\sin\gamma + \sin\delta\sin\phi'\cos\gamma)\cos\phi$ $a_{21} = (-\sin\delta\cos\gamma + \cos\delta\sin\phi'\sin\gamma)\cos\theta - \cos\delta\cos\phi'\cos\phi\sin\theta + (\sin\delta\sin\gamma + \cos\delta\sin\phi'\cos\gamma)\sin\phi\sin\theta$ $a_{22} = (-\sin\delta\cos\gamma + \cos\delta\sin\phi'\sin\gamma)\sin\theta + \cos\delta\cos\phi'\cos\phi\cos\theta - (\sin\delta\sin\gamma + \cos\delta\sin\phi'\cos\gamma)\sin\phi\cos\theta$ $a_{23} = \cos\delta\cos\phi'\sin\phi + (\sin\delta\sin\gamma + \cos\delta\sin\phi'\cos\gamma)\cos\phi$ $a_{31} = \cos\phi'\sin\gamma\cos\theta + \sin\phi'\cos\phi\sin\theta + \cos\phi'\cos\gamma\sin\phi\sin\theta$ $a_{32} = \cos\phi'\sin\gamma\sin\theta - \sin\phi'\cos\phi\cos\theta - \cos\phi'\cos\gamma\sin\phi\cos\theta$ $a_{33} = -\sin\phi'\sin\phi + \cos\phi'\cos\gamma\cos\phi$ Using the transformation equations derived above and vector analysis techniques, the desired quantities in FIG. 1B needed for modeling an interconnecting spool can be developed in terms of the measured parameters.

Since the $X_5$ axis in parallel to the $X'$ axis and the direction cosines of the $X_5$ axis relative to the $X, Y, Z$ axes are the elements in row one of the $\overline{A}$ matrix, the direction cosines of the $X'$ axis relative to the $X, Y, Z$ axes are $$l_1 = a_{11}\quad m_1 = a_{12}\quad n_2 = a_{23}$$

Similarly, the direction cosines of the $Y'$ axis are the elements in row two of the $\overline{A}$ matrix and are $$l_2 = a_{21}\quad m_2 = a_{22}\quad n_2 = a_{23}$$

The direction cosines of the $Z'$ axis are the elements in row three of the $\overline{A}$ matrix are $$l_3 = a_{31}\quad m_3 = a_{32}\quad n_3 = a_{33}$$

The location of the origin $O'$ of the $X'$, $Y'$, $Z'$ coordinate axis system relative to the $X, Y, Z$ system is expressed in terms of the length of the line $L_1$ which extends between the two coordinate axis systems and the direction cosines of the line as follows:

$$X_o' = L_1 l_o, Y_o' = L_1 M_o, Z_o' = L_1 N_o$$

The line of intersection I of the planes $P_1$ and $P_2$ is given by the simultaneous solution of the equations of the two planes $P_1$ and $P_2$. The equation of plane $P_2$ in $X, Y, Z$ coordinates can be written as $$ax + by + cz + d = 0$$

where
$a = m_3 n_1 - m_1 n_3$ $b = n_3 l_1 - n_1 l_3$ $c = l_3 m_1 - l_1 m_3$ $d = -(ax_o' + by_o' + cz_o')$ and the equation of plane $P_1$ in $X, Y, Z$ coordiantes is $$y = 0$$

Thus, the equation of the intersection I of $P_1$ and $P_2$ in $X, Y, Z$ coordinates is $$ax + cz + d = 0,\ y = 0$$

In plane $P_1$, the line OB is drawn through the origin O such that it is perpendicular to the line of intersection of the planes $P_1$ and $P_2$ with point B being the point of intersection of the two lines. The distance of line OB, which is expressed as $L_2$ is given by $$L_2 = \frac{d}{\sqrt{a^2 + c^2}}$$

The angle $\Delta$ between the line OB and the positive Z axis is given by $$\Delta = \mathrm{sign}\left[\frac{-a\,\mathrm{sign}\,(d)}{\sqrt{a^2 + c^2}}\right] \cos^{-1}\left[\frac{-c\,\mathrm{sign}\,(d)}{\sqrt{a^2 + c^2}}\right]$$

The direction cosines of the line of intersection I are given by $$l = \frac{-c\,\mathrm{sign}\,(d)}{\sqrt{a^2 + c^2}}$$
$$m = o$$
$$n = \frac{+a\,\mathrm{sign}\,(d)}{\sqrt{a^2 + c^2}}$$

The direction cosines of the line OB are given by $$l_4 = -n\quad m_4 = 0\quad n_4 = 1$$

Finally, the coordinates of point B are $$X_B = L_2 l_4$$
$$Y_B = L_2 m_4 = 0$$
$$Z_B = L_2 n_4$$

In plane $P_2$, the line O'C is drawn in plane $P_2$ and is perpendicular to the line of intersection I with point C being the point of intersection. Also shown in $P_2$ is the line O'B the length of which is $$L_3 = \sqrt{(X_B - X_O')^2 + (Y_B - Y_O')^2 + (Z_B - Z_O')^2}$$

The direction cosines $l_5$, $m_5$, $n_5$ of line O'B relative to the X, Y, Z axes are $$l_5 = \frac{X_B - X_O'}{L_3}$$
$$m_5 = \frac{Y_B - Y_O'}{L_3}$$
$$n_5 = \frac{Z_B - Z_O'}{L_3}$$

The angle $\epsilon$ between the line O'B and the line of intersection I is given by $$\cos \epsilon = l_5 l + m_5 m + n_5 n$$

The length $L_4$ of line CB is given by $$L_4 = L_3 |\cos \epsilon|$$

The length $L_5$ of O'C is then obtained as $$L_5 = L_3 |\sin \epsilon|$$

The coordinates of the point C are given by $$X_c = X_B - L_4 l$$
$$Y_c = Y_B - L_4 m$$
$$Z_c = Z_B - L_4 n$$

The direction cosines of the line O'C are $$l_6 = \frac{X_c - X_c'}{L_5}$$
$$m_6 = \frac{Y_c - Y_o'}{L_6}$$
$$n_6 = \frac{Z_c - Z_o'}{L_5}$$

The angle $\Delta'$ in plane $P_2$ between the line O'C and the positive Z' axis is given by $$\cos \Delta' = l_3 l_6 + m_3 m_6 + n_3 n_6$$

The angle $\lambda$ in plane $P_2$ between the line of intersection I and the positive Z' axis is $$\cos \lambda = l\, l_3 + m\, m_3 + n\, n_3$$

Thus, the angle $\Delta'$ can also be expressed as $$\Delta' = \text{sign} (\cos \lambda) \cos^{-1} (\cos \Delta')$$

The angle $2\mu$ between plane $P_1$ and $P_2$ is given by $$\cos (2\mu) = l_4 l_6 + m_4 m_6 + n_4 n_6$$

With the above quantities determinable from the equations expressed in terms of the measured parameters, an interconnecting spool can be designed in component sections which can be welded together. In joining the points O' and o' by line segments, two different cases are involved. One case is that wherein the points B and C are coincident; that is, C and B line in the same plane. In the second case and the more general situation, C and B are displaced apart some distance along the line of intersection I. Although either situation can be presented in a pipeline end misalignment situation, where the terrain of the ocean bottom is flat, the centers of the pipeline ends will lie close to a common plane. In the discussion which follows, it will be assumed that the centers of the pipeline ends are coplanar.

The angle $\nu$ will be used to represent the angle through which flow must turn in going from O to O'. $\sigma$ will be the maximum allowable flow turning angle, and $t$ will be the minimum number of turns required such that no turn exceeds the angle $\sigma$. Accordingly, $$t = (\nu/\sigma)$$

For each turn required, the flow turning angle $\tau$ is chosen to be the same for each turn with $\tau$ being no greater than $\sigma$. Hence, $$t = (\nu/\sigma)$$

The number (S) of spool segments required to turn the flow through $\nu$ subject to the maximum turning angle limitation is $S = 2 + t$. By assignment $S_i$ as the length of a spool segment, where $i$ is the spool segment identifying index, the total length $L_s$ of the spool between o and o' can be expressed as follows:

$$L_s = \sum_{i=1}^{S} S_i$$

The length $L_1$ between o and o' is related to the spool segment lengths $S_i$ and the angles $\nu$ and $\tau$ by the equation $$L_1 = \sum_{i=1}^{S} S_i \cos \left[ \frac{\nu}{2} - (i-1)\tau \right]$$

A further constraint is placed on the problem by requiring each spool segment to be of the same length such that $S_i$ is equal to S. The solution for S is then obtained from $$S = \frac{L_1}{\sum_{i=1}^{S} \cos \left[ \frac{\nu}{2} - (i-1)\tau \right]}$$

After solving for S for each spool segment, the segments can be made from straight pipe lengths in the following manner.

Figure 7:
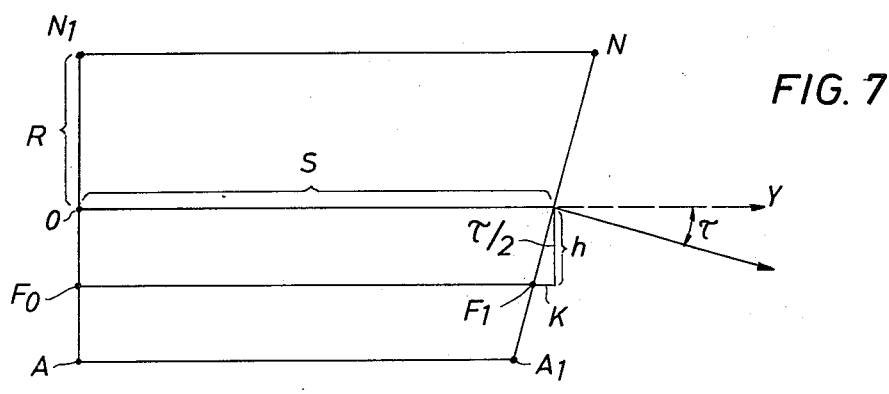
FIG. 7 is a side view of an end segment of a spool that is to be fabricated to interconnect the pipe ends shown in FIG. 1B, which end segment is to be attached to the end that lies in plane $P_1$.

For the first segment shown in FIG. 7, which attaches to pipeline end 10 in FIG. 1A ($S_1$ in plane $P_1$ in FIG. 1B), the reference point Z, N is located. The angle $\Delta$ from Z, N is determined and a point marked as A on the periphery of the pipe. An arbitrary angle $\rho$ is measured from A and a point $F_o$ is marked on the spool segment. From FIG. 7, $h$ and $k$ can be determined as $$h = R \cos \rho$$

$$k = h \tan (\tau/2)$$

The length $F_o F_1 = S - k = S - R \cos \rho \tan (\tau/2)$. To cut the segment shown in FIG. 7, a piece of pipe must be used that is at least $S + R \tan (\tau/2)$ in length.

The layout for the spool segment which attaches to pipe end 14 of FIG. 1A ($S_2$ in plane $P_2$ in FIG. 1B) is fabricated in the same manner as the spool segment that attaches to pipe end 10.

The procedure for determining the configuration for the intermediate spool segments follows the same procedure as the end segments of the spool. An intermediate spool section to connect the two end segments together must be at least $S + 2R \tan (\tau/2)$ in length.

The spool segments are connected together by matching the points A and N on each segment to make up the overall spool.

The foregoing description of the present invention has been directed to a particular preferred embodiment thereof for the purposes of explanation and illustration. It will be apparent, however, to those skilled in this art that many modifications and changes may be made in the apparatus without departing from the scope and concept of the invention. For example, the gimbal assemblies may be implemented by ball-and-socket joints rather than the yoke and axle arrangement shown. Also, although the foregoing description of the preferred embodiment was made with regard to pipeline sections having flanges at their ends, the present invention is not limited solely to such application as the present invention can also be utilized effectively with pipeline sections without flanges. In such an application, the gimbal assemblies can be mounted on plugs rather than templates, which plugs can be inserted into the ends of the pipeline sections. These, and other modifications of the invention will be apparent to those skilled in the art. It is the applicant's intention in the following claims to cover all such equivalent modifications and variations as fall within the scope of the invention.

What is claimed is:

1. A method for connecting two stationary misaligned pipes comprising:
   affixing a frame at the end opening of each pipe, each frame carrying a gimbal assembly defining in a reference position a pair of coplanar mutually perpendicular axes lying in a plane parallel to the face of the end opening;
   securing the respective ends of an extensible elongate member to each gimbal assembly by connections which serve to reorient each gimbal assembly to a unique reoriented position determined by the direction at which the elongate member interconnects with the gimbal assembly;
   measuring the angular displacement of the gimbal assembly about its axes to indicate the movement of each gimbal assembly from reference positions to reoriented positions;
   measuring the length of the extensible member as it is secured to the gimbal assemblies;
   measuring the angle, projected on a plane perpendicular to said extensible elongate member, between the axes of each gimbal assembly; in the reference positions
   fabricating a spool for interconnecting the pipe ends according to the defined spatial relationship; and
   interconnecting the two end openings with the spool.

2. The method of claim 1 wherein the step of fabricating the interconnecting spool includes:
   reconstructing the spatial relationship of the misaligned pipelines at the fabrication site by pipe end simulators mounted on a pair of spaced devices having two mutually perpendicular axes of rotation giving free angular movement in two directions that are set to place the pipe end simulators at the same disposition as the misaligned pipe ends, according to the registered parameters transmitted from the underwater location; and
   assembling appropriate sections of pipe to form a spool that interconnects between the pipe end simulators.

3. The method of claim 1 wherein the step of fabricating the interconnecting spool includes:
   entering the registered values of said parameters into a computer programmed to develop the specifications of the spool sections; and
   assembling sections of pipe conforming to the specifications developed by the computer to form a spool that will be of a configuration adapted to interconnect the ends of the two misaligned pipe ends.

4. A method of determining the spatial relationship between two misaligned pipes comprising the steps of:
   placing a frame including a gimbal assembly on each pipe end to define, with respect to a known reference point on each pipe, a pair of three-axis orthogonal coordinate systems having their respective origins at known positions relative to the centers of the two pipe faces, a first coordinate system having a pair of mutually perpendicular X, Z axes defined by the axes of the first gimbal assembly and lying in a plane parallel to the first pipe face and a Y axis defined by the centerline of the first pipe, and a second coordinate system having a pair of mutually perpendicular X', Z' axes defined by the axes of the second gimbal assembly and lying in a plane parallel to the second pipe face and a Y' axis defined by the centerline of the second pipe;
   measuring by direct readings the following geometric parameters:
   (a) the center-to-center distance between the origins defining a line segment, $L_1$;
   (b) the angular displacement, $\theta$, of $L_1$ about the Z axis;
   (c) the angular displacement, $\phi$, of $L_1$ about the X axis;
   (d) the angular displacement, $\theta'$, of $L_1$ about the Z' axis;
   (e) the angular displacement, $\phi'$, of $L_1$ about the X' axis; and
   (f) the angular displacement, $\gamma$, between axes X, Z and axes X', Z' as projected onto a plane perpendicular of $L_1$.

5. A method as claimed in claim 3 wherein parameters (a) and (f) are measured by an extensible member connected between the origins and which has at least one end which is rotatable relative to the coordinate system in the pipe face to which it extends and parameters (b), (c), (d) and (e) are measured by a pair of gimbals, one gimbal being mounted at each of the origins.

6. A method as claimed in claim 4 including the step of measuring the parameters by electrical sensing means mounted on the member and the gimbals.

7. A method as claimed in claim 5 including the step of transmitting electrical signals representative of measured values of the parameters from the pipe location to a location remote therefrom.

8. An apparatus for generating the necessary parameters for construction of a spool to connect two misaligned pipes, comprising:
   two frames adapted to be fitted on pipe ends in known positions with respect to reference points on the pipes, each frame including a gimbal assembly having a gimbal portion independently orientable about two mutually perpendicular gimbal axes;

a straight extensible connector having ends interconnecting said gimbal portions of said gimbal assemblies;

said connector comprising at least two portions providing relative rotation about the axis of the connector between at least one end of said connector and the gimbal portion to which it connects to permit interconnection of the connector to each gimbal portion with said connector thereby positioned in a unique rotated position defining the angular displacement resultant from said relative rotation;

first measurement means to measure the length of said connector when interconnected between said gimbal portions, second measurement means to measure the angular displacement resultant from the relative rotation of said one end of said connector and the gimbal portion to which it connects, and third, fourth, fifth and sixth measurement means to measure the rotational displacement of each of the two gimbal portions about each of the two axes about which it is rotatable when said connector is interconnected between the two gimbal portions; and means for displaying the measured values at a remote location.

9. An apparatus as claimed in claim 8 wherein said measurement means comprises plural electrical sensing means operating to produce electrical signals functionally related to the measured values.

10. An apparatus as claimed in claim 9 wherein the electrical sensing means are variable impedence electrical devices.

11. A method for generating the necessary parameters for construction of a spool to connect two misaligned pipes utilizing a measurement tool including two frames adapted for being mounted on the respective pipe faces and an elongate connecting member extending between gimbal assemblies on each frame, comprising the steps of:

mounting a frame on each pipe end in a known position with respect to a reference point on the pipe, each frame including a gimbal assembly;

each said gimbal assembly having a portion which is orientable about two mutually perpendicular gimbal axes, the first of which is parallel to the face of the pipe and with the axis of the pipe defines a three-axis orthogonal coordinate system, the first gimbal axis of each gimbal assembly being mounted in a known position with respect to a reference point on the pipe face;

extending the elongate connecting member between said gimbal assemblies;

said connecting member having ends which are adapted to interconnect the orientable portions of said gimbal assemblies with the first gimbal axes of the gimbal assemblies in a determinable angular position relative to one another as measured in a plane perpendicular to said connecting member;

positioning the orientable portions of said gimbal assemblies to be connected with the connecting member;

connecting said connecting member between the orientable portions of the gimbal assemblies;

measuring the length of the connecting member in the interconnected position;

measuring the rotational displacement of each orientable portion of each gimbal assembly about each of the axes of the gimbal assembly; and measuring the angular displacement between said first axes of said gimbal assemblies as projected upon a plane perpendicular to said connecting member.

12. The method of claim 11 wherein the ends of the connecting member are rotatable relative to each other and including the step of rotating at least one end of the connecting member relative to the orientable portion of the gimbal assembly to which it connects in order to interconnect the connecting member with the orientable portions of each of the gimbal assemblies, with each end of the connecting member in a known angular attitude with respect to the first gimbal axis of the gimbal assembly to which it connects.

13. The method of claim 11 wherein the steps of measuring the length of the connecting member, measuring the rotational displacement about the gimbal axes, and measuring said angular displacement are performed by electrical sensing means operating to produce an electrical signal functionally related to the measured values.

14. The method of claim 13 wherein the electrical sensing means are variable impedance electrical devices.

15. The method of claim 13 including the step of transmitting the measured values of length of connection member, rotational displacement and angular displacement from the location of the misaligned pipelines to a location remote therefrom.

16. The method of claim 15 wherein the step of transmitting the measured values includes transmitting electrical signals representative of the measured values over wires.

17. A method for determining the spatial relationship between two misaligned pipes laying on the floor under a body of water comprising the steps of:

placing a frame on each pipe end, each said frame including a gimbal assembly having a gimbal portion orientable about two mutually perpendicular axes, the first of which is parallel to said pipe face and defines together with the axis of the pipe a three axis orthogonal coordinate system with the gimbal portions at the origins thereof;

measuring by a first transducer the distance between the gimbal portions at the origins of said coordinate systems by connecting an elongate member therebetween;

measuring by second through fifth transducers the displacement of the two gimbal portions about each of the two axes about which the gimbal portion of each gimbal assembly is orientable;

measuring by a sixth transducer the angle between the projections of each of the gimbal axes parallel to the pipe face on a plane perpendicular to said elongate member; and reading out said parameters to a remote location by polling said transducers.

18. A method for determining the spatial relationship between two misaligned pipes comprising the steps of:

mounting a frame proximate the end of each pipe in a known position with respect to a reference on the pipe, each frame including a gimbal assembly with rotational freedom about two mutually perpendicular gimbal axes which, in a reference position parallel to the face of the pipe and together with the central axis of the pipe, define a three-axis orthogonal coordinate system;

extending between the gimbal assemblies a straight elongate connecting member having at each end a registry portion coupled before measurement with a mating portion on one of the gimbal assemblies to be in a known angular position relative to the gimbal axes of the gimbal assembly to which it is coupled;

securing the registry portions to the mating portions of the positioned gimbal assemblies;

measuring the length of the connecting member in the extended position;

measuring about each gimbal axis the rotational displacement from the reference position to the registered position with the connecting member extending in registry therebetween; and measuring the rotational angle between the points of registry indicative of the angular displacement between the respective mutually perpendicular axes of the gimbal assemblies as projected on a plane perpendicular to said connecting member.

19. The method of claim 18 wherein the registry portions at each end of said connecting member are rotatable relative to each other about the axis of the connecting member and including the step of rotating one end of the connecting member relative to one of the gimbal assemblies and positioning each gimbal assembly about its axes to receive the ends of the connecting member so that the assembly mating portion may couple with a respective registry portion of the connecting member.

20. A method as claimed in claim 18 wherein said pipes have flanged ends adapted to be coupled to a mating member with bolts and wherein each said frame comprises a template and said mounting step includes attaching a template to a flange at the end of each pipe.

21. An apparatus for determining the spatial relationship between two misaligned pipes having substantially planar ends and for identifying on each face of an interconnecting spool a point which will coincide after assembly with a known point on the face of each pipe, comprising:
a pair of frames adapted for attachment to the pipe ends and having aligning means for referencing the orientation thereof with respect to a known point on the pipe;
first and second gimbal assemblies each mounted on a frame and defining a three axis orthogonal coordinate system having two mutually perpendicular axes lying in a plane parallel to the face of the end;
a staight extensible connector member connected at its end to said first and second gimbal assemblies to define a straight line between the gimbal assemblies;
said connector member having means capable of defining and retaining a known displacement of one gimbal system with respect to the other;
a transducer for each gimbal axis for registering the rotation of said member about the two axes of the respective gimbal assemblies when the gimbals thereof are positioned for connection to said member;
a fifth transducer for registering the length of said extensible member when connected between the gimbal assemblies; and
means for transmitting the values of the parameters registered by said transducers to a read-out device at a remote location.

22. The apparatus of claim 21 wherein at least one end of said extensible connector member is relatively rotatable with respect to the gimbal assembly to which it couples about the axis of the extensible connector member, and including a sixth transducer to measure the angular displacement resultant from said relative rotation.

23. The apparatus of claim 21 wherein said means for transmitting comprises:
a transmitter for producing a signal representative of a parameter, the characteristics of the signal being determined by the electrical property exhibited by the respective electrical sensing means;
a display remote from the underwater location of the pipelines for receiving the signal from said transmitter and presenting the value of the parameter on a readout device.

24. The apparatus of claim 23 wherein said transmitter includes means for sequentially connecting each of said transducers to produce a series of signals, each of which represents one of the parameters; and wherein said transmitter is connected to said display by electrical conductors.

25. The apparatus of claim 21 wherein each of said transducers comprises a variable impedance electrical device, each of said devices presenting an impedance functionally related to the parameter represented thereby.

26. The apparatus of claim 25 wherein each of said electrical sensing means is a potentiometer.

27. An apparatus for generating the necessary parameters for construction of a spool to connect two misaligned pipes, comprising:
two frames adapted for mounting on each pipe end;
a gimbal mounted on each frame, each gimbal having a mating portion orientable about two mutually perpendicular axes, the first of which remains parallel to the pipe face and defines together with the axis of each pipe a three-axis orthogonal coordinate systems having the gimbals at the origins thereof;
an extensible elongate connector member having mating portions at the ends thereof connected with mating portions of the gimbals;
means providing relative rotation in a plane perpendicular to the axis of the extensible member between the mating portion of the connector member and the mating portion of the gimbal to which it connects;
first means for measuring the length of said extensible member in the interconnected position;
second through fifth means for measuring the rotational displacement of each of the two gimbals about each gimbal axis in the interconnected position;
sixth means for measuring the angular displacement of the extensible member about its longitudinal axis resultant from the relative rotation between said end of the extensible member and the mating portion of the gimbal to which it connects; and
said first through sixth means each comprising electrical sensing means operating to produce an electrical signal functionally related to the measured value.

28. An apparatus as claimed in claim 27 wherein said first through sixth means comprise variable impedence electrical devices having associated means for transmitting the electrical signals to a remote location.

* * * * *

UNITED STATES PATENT AND TRADEMARK OFFICE
CERTIFICATE OF CORRECTION

PATENT NO. : 4,120,095
DATED : October 17, 1978
INVENTOR(S) : Maurice P. LEBOURG It is certified that error appears in the above—identified patent and that said Letters Patent are hereby corrected as shown below:

IN THE SPECIFICATION:

Column 1, line 28, delete "through" and insert --though--.

Column 5, line 58, delete "Templates" and insert --Template--.

Column 10, line 23, delete "$\theta$" and insert --$\theta'$--.

Column 10, line 42, delete "ratio" and insert --radio--.

Column 13, line 15, delete "axis" and insert --axes--.

Column 13, line 31, delete "↓" and insert --$\gamma$--.

Column 15, line 41, delete "$L_6$" and insert --$L_5$--.

IN THE CLAIMS:

Claim 5, line 1, delete "3" and insert --4--.

Signed and Sealed this

Twelfth Day of June 1979

[SEAL]

Attest:

RUTH C. MASON
Attesting Officer

DONALD W. BANNER
Commissioner of Patents and Trademarks